(12) United States Patent
Paterour et al.

(10) Patent No.: US 9,942,936 B2
(45) Date of Patent: Apr. 10, 2018

(54) QUICK-START METHOD, TERMINAL AND SYSTEM FOR RADIO COMMUNICATION

(71) Applicant: AIRBUS DS SAS, Elancourt (FR)

(72) Inventors: Olivier Paterour, Guyancourt (FR); Frédéric Risy, Boulogne Billancourt (FR); Christian Lefay, Versailles (FR)

(73) Assignee: AIRBUS DS SAS, Elancourt (FR)

( * ) Notice: Subject to any disclaimer, the term of this patent is extended or adjusted under 35 U.S.C. 154(b) by 30 days.

(21) Appl. No.: 15/037,351

(22) PCT Filed: Nov. 7, 2014

(86) PCT No.: PCT/EP2014/002979
§ 371 (c)(1),
(2) Date: May 18, 2016

(87) PCT Pub. No.: WO2015/074742
PCT Pub. Date: May 28, 2015

(65) Prior Publication Data
US 2016/0286596 A1    Sep. 29, 2016

(30) Foreign Application Priority Data
Nov. 19, 2013 (FR) .................................... 13 02664

(51) Int. Cl.
*H04W 76/02* (2009.01)
*H04W 4/22* (2009.01)
(Continued)

(52) U.S. Cl.
CPC ........... *H04W 76/026* (2013.01); *H04L 43/16* (2013.01); *H04W 4/22* (2013.01); *H04W 88/06* (2013.01); *H04W 84/08* (2013.01)

(58) Field of Classification Search
CPC ....... H04W 4/22; H04W 84/08; H04W 88/06; H04W 76/02; H04W 84/02; H04L 43/16; H04L 12/26
See application file for complete search history.

(56) References Cited

U.S. PATENT DOCUMENTS

2006/0262800 A1 * 11/2006 Martinez ............... H04W 88/06
370/395.52
2011/0237287 A1 * 9/2011 Klein ................ H04M 3/42178
455/521

(Continued)

FOREIGN PATENT DOCUMENTS

WO    WO 2006/125043 A1    11/2006

OTHER PUBLICATIONS

International Search Report as issued in International Patent Application No. PCT/EP2014/002979, dated Feb. 20, 2015.

(Continued)

*Primary Examiner* — Lakeram Jangbahadur
(74) *Attorney, Agent, or Firm* — Pillsbury Winthrop Shaw Pittman LLP

(57) ABSTRACT

A mobile communication terminal includes a narrow-band communication module, a broad-band communication module, a first operating module and a second operating module, the first operating module being configured in order to establish a communication through a narrow-band communication network via the narrow-band communication module, the second operating module being configured to establish a communication through the narrow-band communication network via the narrow-band communication module and in order to establish a communication through a broad-band communication network via the broad-band communication module.

9 Claims, 2 Drawing Sheets

(51) Int. Cl.
H04W 88/06 (2009.01)
H04L 12/26 (2006.01)
H04W 84/08 (2009.01)

(56) References Cited

U.S. PATENT DOCUMENTS

2013/0203461 A1* 8/2013 Li .................. H04W 88/06
  455/552.1
2014/0133530 A1* 5/2014 Maguire ............ H04B 1/38
  375/219

OTHER PUBLICATIONS

"Terrestrial Trunked Ratio (TETRA); User Requirement Specification TETRA Release 2.1; Part 6: Smart Card (SC) and Subscriber Identity Module (SIM)," Technical Report, European Telecommunications Standards Institute (ETSI), ETSI TR 021-6 V1.2.1, Aug. 2011, 650. Route Des Lucioles; F-06921 Sophia-Antipolis; France, vol. TETRA 1, No. V1.2.1.1, Aug. 2011 (Aug. 1, 2011), XP014067969, Sections 4 and 4.1; 14 pages.

Baldini, G., et al., "The evolution of Public Safety Communications in Europe: the results from the FP7 HELP project," ETSI Reconfigurable Radio Systems Workshop, Dec. 2012, 10 pages, Dec. 6, 1012 (Dec. 6, 1012), XP055133430, Sophia Antipolis, France; Retrieved from the Internet: URL:http://upcommons.upc.edu/e-prints/bitstream/2117/22884/1/The evolution of Public Safety Communications in.pdf [retrieved on Aug. 6, 2014], abstract, Section B, figures 1, 2.

Eads: "EPS and UE functional and performance requirements for GCSE_LTE" 3GPP TSG-SAA WG1 Ad Hoc GCSE_LTE, Nov. 2012, S1-123034. 3rd Generation Partnership Project (3GPP), Mobile Competence Centre; 650, Route Des Lucioles; F-06921 Sophia-Antipolis Cedex France, vol. SA WG1, No. Edinburgh. UK; Nov. 8, 2012-Nov. 9, 2012, Nov. 19, 2012 (Nov. 19, 2012), XP050681979; Retrieved from the Internet: URL:http://www.3gpp.org/ftp/tsg_sa/WG1_Serv/TSGS1_60_GCSE_adhoc/docs/; [retrieved-on Nov. 19, 2012], Sections 1 and 4.t, 16 pages.

* cited by examiner

QUICK-START METHOD, TERMINAL AND SYSTEM FOR RADIO COMMUNICATION

CROSS-REFERENCE TO RELATED APPLICATIONS

This is the U.S. National Stage of PCT/EP2014/002979, filed Nov. 7, 2014, which in turn claims priority to French Patent Application No. 13 02664, filed Nov. 19, 2013, the entire contents of all applications are incorporated herein by reference in their entireties.

TECHNICAL FIELD AND SUBJECT MATTER OF THE INVENTION

The present invention relates to the field of telecommunications and more particularly relates to a communication terminal, method and system.

STATE OF THE PRIOR ART

Private Mobile Radiocommunications (PMR) networks, such as, for example, Tetra, Tetrapol or P25 type networks are used ordinarily by professionals of security services (army, police, ambulance, fire brigade, etc.), building construction or public works companies or instead industry. Such networks use dedicated frequency bands, for example according to the type of user, and are closed networks, that is to say for which transmission access is limited to a predetermined group of professionals.

The services offered by the communication terminals of a PMR network of Tetra, Tetrapol or P25 type are limited on account of the restricted number of resources available in such a network. This type of network thus enables uniquely the transmission of vocal or data communications at low data transfer rate. It is thus not possible to send data at high data transfer rates through such a network. As an example, it is not possible to transmit a video communication between two terminals through such a network.

To overcome this drawback, broad-band PMR networks are known today which make it possible to exchange data at high data transfer rates, above 1 Mb/s, for example to enable a video-conference to be held.

Such networks require the use of "smartphone" type terminals offering a vocal communication service similar to that of a PMR terminal known to those skilled in the art as "Push-to-talk". Such a terminal uses in a known manner an operating module including an operating system (OS) of iOS®, Windows Phone®, Windows Mobile® or Android® type.

Such an operating system requires however a relatively long booting time, at least around 45 seconds, which is a drawback. Yet, in order to be able to be useable for emergency services, for example by the police or the fire brigade, a terminal must satisfy standard requirements and must notably be able to be operational in less than 10 seconds. The term "operational" is taken to mean that the terminal is useable to communicate through the network.

GENERAL DESCRIPTION OF THE INVENTION

The aim of the present invention is to overcome at least in part these drawbacks by proposing a communication terminal that boots in less than ten seconds in order to be able to offer rapidly basic PMR services such as, for example, a voice type communication, while then offering high transfer rate data services and reliability.

To this end, the subject matter of the invention is a mobile communication terminal characterized in that it includes a narrow-band communication module, a broad-band communication module, a first operating module and a second operating module, said first operating module being configured to establish a communication through a narrow-band communication network via said narrow-band communication module, preferably within a time period less than ten seconds after the booting of said terminal, said second operating module being configured to establish a communication through said narrow-band communication network via the narrow-band communication module and to establish a communication through a broad-band communication network via said broad-band communication module.

Advantageously, the broad-band communication module is configured to communicate or to exchange data with a broad-band communication network at a data transfer rate above 1 Mb/s, preferably 10 Mb/s.

Such a so-called "dual" communication terminal thus makes it possible to communicate very rapidly after its booting via the narrow-band network using the first operating module then to continue to communicate thereafter via the narrow-band network using the second operating module which offers greater richness at the level of the interface between the terminal and a user of said terminal (called human-machine interface or HMI) and which makes it possible notably to access data services at high data transfer rate through a broad-band network via the broad-band communication module.

In addition, such a terminal has the advantage of being able to communicate through a secure narrow-band communication network of narrow-band PMR type when a security breach is detected in the second operating module which may be more easily pirated when it communicates through a public broad-band communication network via the broad-band communication module.

According to an aspect of the invention, the first operating module includes a first operating system configured to execute instructions making it possible to establish a communication through a narrow-band communication network via the narrow-band communication module, and the second operating module includes a second operating system configured to establish a communication through said narrow-band communication network via the narrow-band communication module and to establish a communication through a broad-band communication network via the broad-band communication module.

Preferably, the first operating system includes a limited number of booting tasks so as to be operational within a time period less than ten seconds after the booting of the terminal. Booting of the terminal is taken to mean the instant from which the terminal switches from a "shutdown" mode to an "enabled" mode. In addition, the term "operational" is taken to mean that the first operating system is ready to establish a communication through the narrow-band communication network.

To this end, the first operating system is preferably a simplified system of Linux type which makes it possible to establish very quickly, in less than ten seconds, a communication through the narrow-band communication network via the narrow-band communication module. It should be noted that the operation of said terminal with this first operating system may also be carried out without a screen in another embodiment, also called "covert mode".

The second operating system may be, for example, an operating system of Android®, iOS®, Windows Phone® or Windows Mobile® type. An operating system of Android® type being based on a Linux core, its booting time thus has to be added to that of the Linux core before being able to establish a communication at the end of around forty five seconds.

In a preferred manner, the terminal includes a management module of the first operating module and the second operating module.

According to a characteristic of the invention, the management module is configured to boot the first operating system and the second operating system.

Advantageously, the management module is configured to select alternatively one of the first operating module and the second operating module. The first operating module and the second operating module are thus used alternatively to communicate through the narrow-band communication network or even through the broad-band communication network.

In a preferred manner, the management module is in the form of a hypervisor configured to select the first operating module or the second operating module, more precisely respectively the first operating system or the second operating system, such that one or the other is used to communicate.

According to an aspect of the invention, the management module is configured to select, preferably automatically, the second operating module when the booting phase of the second operating system is finished.

According to another aspect of the invention, the management module is configured to select, preferably automatically, the first operating module following a malfunction of the second operating system, or instead when, the terminal including a battery, the battery level is below a predetermined threshold. The term malfunction here and in the remainder of the description covers for example: re-booting situations (following a crash), absence of activity (due to a bug or a malware) or conversely too intense activity (monopolization of the CPU) resulting from a bug or from a malware causing a denial of service.

In a preferred form of embodiment of the terminal according to the invention, the terminal includes a third operating module configured to establish a communication through a broad-band communication network via the broad-band communication module. Such a third operating module may make it possible to access services different to those which are accessible by the second operating module. For example, the third operating module may be configurable directly by the user of the terminal whereas the second operating module may be configurable uniquely by an administrator of the narrow-band communication network. The term "configurable" is taken to mean the installation, the modification or the deletion of an application making it possible to access a service enabling the communication of data, notably through a broad-band communication network.

Preferably, the third operating module includes a third operating system configured to execute instructions making it possible to establish a communication through a broad-band communication network via the broad-band communication module.

Advantageously, the third operating module being selected, the management module is configured to select, preferably automatically, the second operating module following a malfunction of the third operating system or instead when the terminal receives a communication through a private mobile radiocommunications (PMR) network.

Also advantageously, the third operating module being selected, the management module is configured to select, preferably automatically, the first operating module when, the terminal including a battery, the battery level is below a predetermined threshold.

According to an aspect of the invention, the management module is configured to select one of the first operating module, the second operating module or the third operating module on the action of a user of the terminal, that is to say from a command launched by a user of the terminal. For example, the user may press on one or more keys of the terminal in order to decide to switch from the first operating module to the second operating module or instead from the third operating module to the second operating module, etc.

According to a characteristic of the invention, the management module is configured to transfer a communication established by the first operating module to the second operating module such that the communication is continued via the narrow-band communication module while being managed by said second operating module.

According to another characteristic of the invention, the management module is configured to transfer a communication established by the second operating module via the narrow-band communication module to the first operating module such that the communication is continued via the narrow-band communication module while being managed by said first operating module.

The invention also relates to a system including at least one terminal as described previously, at least one narrow-band communication network and at least one broad-band communication network.

Preferably, the narrow-band communication network is a private mobile radiocommunications network, that is to say a mobile communications system by radio waves used over a short or medium distance. The private mobile radiocommunications radio network may be, for example, a Tetra, Tetrapol, P25 network, etc.

The term "narrow-band" is taken to mean that the network enables the exchange of data at a data transfer rate which is limited to 1 Mb/s.

The broad-band communication network may be a public land mobile network, for example, a 3G UMTS (Universal Mobile Telecommunications System) network, 3G CDMA (Code Division Multiple Access), 4G LTE (Long-Term Evolution), 4G LTE-Advanced (Long-Term Evolution Advanced), Wireless Local Area Network (WLAN), a combination of these networks or generally speaking any broad-band wireless network based on IP technology. The broad-band communication network may also be a private mobile radiotelecommunications network using the resources of one or more public land mobile networks or a satellite network.

The term "broad-band" is taken to mean that the network enables the exchange of data at a data transfer rate above 1 Mb/s.

The term "mobile network" is taken to mean a communication network connecting a plurality of mobile terminals.

The invention also relates to a method of communication implemented by a terminal as described previously, said method being characterized in that it includes a step of establishing by the first operating module a communication through a narrow-band communication network via the narrow-band communication module, preferably within a time period less than ten seconds after the booting of said terminal, followed by a step of transfer of said communication to the second operating module such that the communication is continued through said narrow-band communication network via the narrow-band communication module.

Advantageously, the communication, or exchange, of data with the broad-band communication network is carried out at a data transfer rate above 1 Mb/s, preferably 10 Mb/s.

In a preferred manner, the method includes a preliminary step of booting of the first operating system of the first operating module and a step of booting of the second operating system of the second operating module.

According to an aspect of the invention, the method includes a step of selection of one of the first operating module and the second operating module.

According to an aspect of the invention, the method includes a step of automatic selection of the second operating module when the booting phase of the second operating system is finished.

According to another aspect of the invention, the method includes a step of selection, preferably automatic, of the first operating module following a malfunction of the second operating system, or instead when, the terminal including a battery, the battery level is below a predetermined threshold.

Advantageously, the terminal further including a third operating module, the method includes a step of establishing by said third operating module a communication through a broad-band communication network via the broad-band communication module.

Also advantageously, the third operating module being selected, the method includes a step of selection, preferably automatic, of the first operating module when, the terminal including a battery, the battery level is below a predetermined threshold.

According to an aspect of the invention, the terminal including a third selected operating system, the method includes a step of selection, preferably automatic, of the second operating module following a malfunction of the third operating system, or when the terminal receives a notification or instead when a user manually commands the selection.

According to a characteristic of the invention, the selection may be launched on the action of a user of the terminal, for example by pressing on one or more keys of the terminal, by selecting a command on a touch screen or by using a vocal command.

According to an aspect of the invention, the method includes a step of transfer of a communication established by the first operating module to the second operating module such that the communication is continued via the narrow-band communication module while being managed by said second operating module.

According to another aspect of the invention, the method includes a step of transfer of a communication established by the second operating module via the narrow-band communication module to the first operating module such that the communication is continued via the narrow-band communication module while being managed by said first operating module.

Other characteristics and advantages of the invention will become clear from the description that follows made with regard to the appended figures given as non-limiting examples and in which identical references are given to similar objects.

DETAILED DESCRIPTION OF THE INVENTION

Description of a Form of Embodiment of the System According to the Invention

I. System 1

Figure 1:
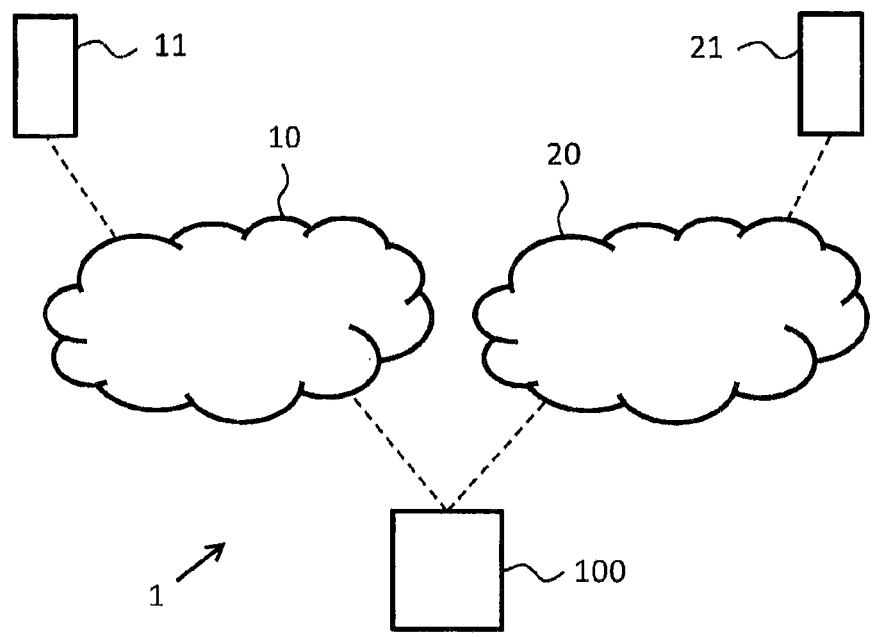
FIG. 1 schematically illustrates a form of embodiment of the system according to the invention.
Figure 2:
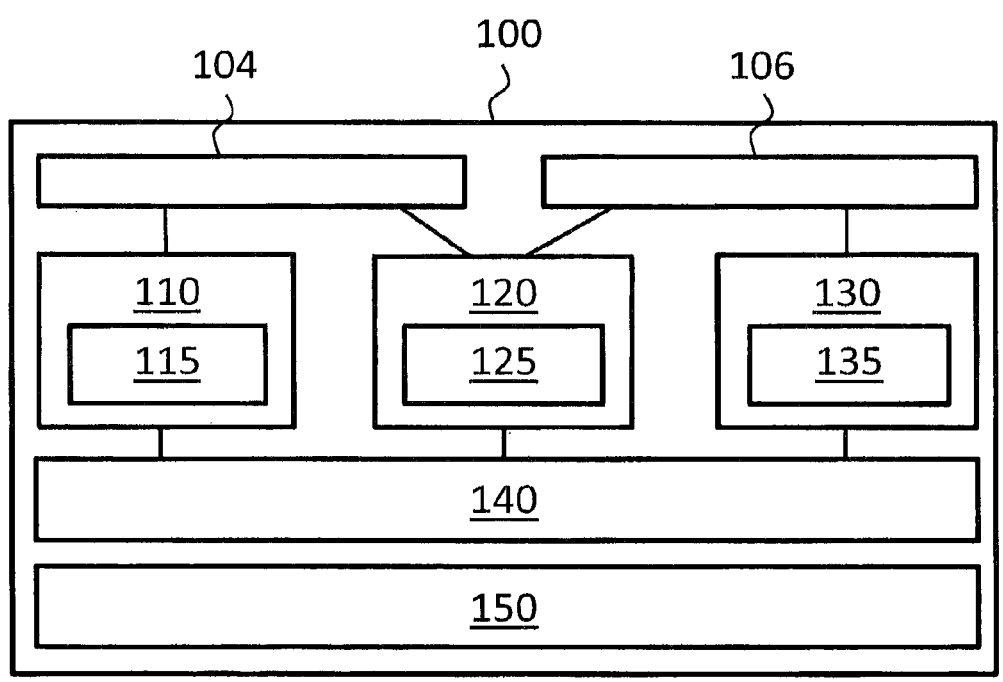
FIG. 2 schematically illustrates a form of embodiment of the terminal according to the invention.

The system 1 illustrated in FIG. 1 includes a narrow-band communication network 10, a broad-band communication network 20, a narrow-band mobile terminal 11, a broad-band mobile terminal 21 and a dual mobile terminal 100 according to the invention.

Only one narrow-band mobile terminal 11, one broad-band mobile terminal 21 and one dual mobile terminal 100 have been illustrated in this example but it goes without saying that the system may include more than one narrow-band mobile terminal 11, more than one broad-band mobile terminal 21 and more than one dual mobile terminal 100.

1) Narrow-band Communication Network 10

The narrow-band communication network is in the form of a private mobile radiocommunications network 10, for example of Tetra, Tetrapol or P25 type, making it possible to interconnect narrow-band mobile terminals 11 and/or dual mobile terminals 100 according to the invention so that they communicate with each other and/or broad-band mobile terminals 21 via a gateway (not represented) established between the narrow-band communication network 10 and the broad-band communication network 20.

Such a network 10 is called Narrow-band Private Mobile Radiocommunications (PMR).

Such networks may include one or more interconnected base stations or instead include uniquely dedicated resource channels (direct mode) useable by the terminals in order to communicate with each other.

Such narrow-band communication networks are characterized by their limited passband and their closure, that is to say that they make it possible to exchange voice data or application data at low data transfer rates, for example less than 1 Mb/s, in general of the order of several Kb/s, without going through open networks of Internet type, in a secure manner.

The term "application data" is taken to mean data exchanged between two entities for the implementation of an application service, such as for example, a messaging service.

Such networks thus only offer, apart from voice and on account of their low passband, a restricted number of services such as, for example, short message services (Short Data Services or SDS), but do not make it possible, for example, to do video or to exchange emails.

2) Broad-band Communication Network 20

The broad-band communication network 20 may be a Public Land Mobile Network (PLMN) such as, for example, a 3G UMTS network (Universal Mobile Telecommunications System), 3G CDMA (Code Division Multiple Access), 4G LTE (Long-Term Evolution), 4G LTE-Advanced (Long-Term Evolution Advanced), Wireless Local Area Network (WLAN), a combination of one of these networks or generally speaking any broad-band wireless network based on IP technology. The broad-band communication network may also be a private mobile radiocommunications network using the resources of one or more public land mobile networks or a satellite network.

Such networks may include one or more interconnected base stations or instead include uniquely dedicated resource channels (direct mode) useable by the terminals in order to communicate with each other.

The broad-band communication network 20 makes it possible to interconnect broad-band mobile terminals 21 and/or dual mobile terminals 100 according to the invention so that they communicate with each other.

The broad-band communication network 20 enables authorized users of the terminals 21, 100 to access different services (telephony, messaging, data transmissions, broadcasting of audiovisual contents, etc.), notably via the Internet in mobility situations from said portable terminals 21, 100.

Such networks today offer data transfer rates above 1 Mb/s or even 10 Mb/s or more and make it possible to exchange application data in important number for services such as, for example, video services in real time, exchange of emails, files, etc.

3) Narrow-band Mobile Terminal 11

The narrow-band mobile terminal 11 is configured to communicate uniquely via the narrow-band communication network 10 and includes an operating system of which the instructions are in low number in order to exchange uniquely voice data or application data at a low data transfer rate through said narrow-band communication network 10.

4) Broad-band Mobile Terminal 21

The broad-band mobile terminal 21 is configured to communicate uniquely via the broad-band communication network 20 and includes data processing means (not represented) making it possible to exchange data at high data transfer rates, for example to exchange emails, to realize audio or video communications, browse the Web, download files, etc. Such a terminal, for example such as a terminal of smartphone or touch tablet type, includes in a known manner a single operating system, for example of Android®, iOS®, Windows Phone® or Windows Mobile® type.

As mentioned previously, the broad-band mobile terminal 21 may be configured to communicate with a narrow-band mobile terminal 11 or a dual terminal 100 via a gateway established between the narrow-band communication network 10 and the broad-band communication network 20.

5) Dual Mobile Terminal 100

In this example, the dual mobile terminal 100 according to the invention includes a narrow-band communication module 104, a broad-band communication module 106, a first operating module 110, a second operating module 120, a third operating module 130, a management module 140 and a battery 150.

a) Narrow-band Communication Module 104

The narrow-band communication module 104 is in the form of a modem making it possible to communicate voice type data or application data with the narrow-band communication network 10.

b) Broad-band Communication Module 106

The broad-band communication module 106 is in the form of a modem making it possible to communicate data of voice type or application data with the broad-band communication network 20.

The broad-band mobile terminal 21 may communicate with a dual terminal 100 via the narrow-band communication module 104 or via the broad-band communication module 106.

c) First Operating Module 110

The first operating module 110 includes a first operating system 115 of Linux type including a low number of instructions making it possible to establish a communication through the narrow-band communication network 10 via the narrow-band communication module 104 within a time period less than ten seconds after the booting of the dual terminal 100.

The first operating system 115 is configured to manage applications making it possible to exchange voice data or application data through the narrow-band communication network 10 with the narrow-band mobile terminal 11 or another dual terminal 100 connected to the narrow-band communication network 10, the narrow-band communication network 10 only enabling an exchange of data at a low data transfer rate, for example several tens of kilo-octets.

d) Second Operating Module 120

The second operating module 120 includes a second operating system 125 configured to execute instructions making it possible to establish a communication through the narrow-band communication network 10 via the narrow-band communication module 104 and to establish a communication through the broad-band communication network 20 via the broad-band communication module 106.

In other words, the second operating system 125 is configured, on the one hand, to exchange voice data or application data, through the narrow-band communication network 10 via the narrow-band communication module 104, with the narrow-band mobile terminal 11 or another dual terminal 100 connected to the narrow-band communication network 10 and, on the other hand, to exchange voice data or application data, through the broad-band communication network via the broad-band communication module 106, with the broad-band mobile terminal or another dual terminal 100 connected to the broad-band communication network 20, the broad-band communication network 20 enabling an exchange of data at a high data transfer rate, for example above 1 Mb/s or even 10 Mb/s.

In order to exchange voice type data, the second operating system 125 may for example implement an application known to those skilled in the art as "push-to-talk".

In order to exchange application data in important number, the second operating system 125 may for example implement applications known to those skilled in the art of the type video in real time, exchange of emails, files, etc.

In this example, the second operating system 125 may be an Android®, iOS®, Windows Phone® or Windows Mobile® system known to those skilled in the art.

e) Third Operating Module 130

The third operating module 130 includes a third operating system 135 configured to execute instructions making it possible to establish a communication through the broad-band communication network 20 via the broad-band communication module 106.

The third operating system 135 is configured to exchange voice data or application data, through the broad-band communication network 20 via the broad-band communication module 106, with the broad-band mobile terminal 21 or another dual terminal 100 connected to the broad-band communication network 20, the broad-band communication network 20 enabling an exchange of data at a high data transfer rate, for example above 1 Mb/s or even 10 Mb/s.

In order to exchange voice type data, the third operating system 135 may for example implement an application known to those skilled in the art as "push-to-talk".

In order to exchange application data in important number, the third operating system 135 may for example implement applications known to those skilled in the art of the type video in real time, exchange of emails, files, etc.

In this example, the third operating system 135 is an Android®, iOS®, Windows Phone® or Windows Mobile® type system known to those skilled in the art.

In an example of embodiment, the user of the dual terminal 100 may install, modify or delete data exchange applications managed by the third operating system 135 but only an authorized administrator may install, modify or delete data exchange applications managed by the second operating system 125.

f) Management Module 140

The management module 140 is configured to manage the first operating module 110, the second operating module 120 and the third operating module 130.

In this example, the management module 140 is configured to boot the first operating system 115, the second operating system 125 and the third operating system 135.

The management module 140 is configured to select alternatively one of the first operating module 110, the second operating module 120 or the third operating module 130 which can thus be used alternatively to communicate through the narrow-band communication network 10 or the broad-band communication network 20.

To this end, in this example, the management module 140 is in the form of a hypervisor configured to select the first operating module 110, the second operating module 120 or the third operating module 130 such that one of them is used to communicate.

The management module 140 is configured to select, preferably automatically, the second operating module 120 when the booting phase of the second operating system 125 is finished.

The management module 140 is configured to select, preferably automatically, the first operating module 110 following a malfunction of the second operating system 125, or instead when, the terminal 100 including a battery 150, the level of said battery 150 is below a predetermined threshold.

The third operating module 130 being selected, the management module 140 is configured to select, preferably automatically, the second operating module 120 following a malfunction of the third operating system 135, or instead when the terminal 100 receives a communication through a private mobile radiocommunications (PMR) network 10, 20.

The third operating module 130 being selected, the management module 140 is configured to select, preferably automatically, the first operating module 110 when the battery level 150 is below a predetermined threshold.

The management module 140 is configured to select one of the first operating module 110, the second operating module 120 or the third operating module 130 on the action of a user of the terminal 100, that is to say from a command launched by a user of the terminal. For example, the user may press on one or more keys of the terminal in order to decide to switch from the first operating module 110 to the second operating module 120 or instead from the third operating module 130 to the second operating module 120, etc.

The management module 140 is configured to transfer a communication established by the first operating module 110 to the second operating module 120 such that the communication is continued via the narrow-band communication module 104 while being managed by said second operating module 120.

The management module 140 is configured to transfer a communication established by the second operating module 120 via the narrow-band communication module 104 to the first operating module 110 such that the communication is continued while being managed by said first operating module 110.

Example of Implementation of the Invention

Figure 3:
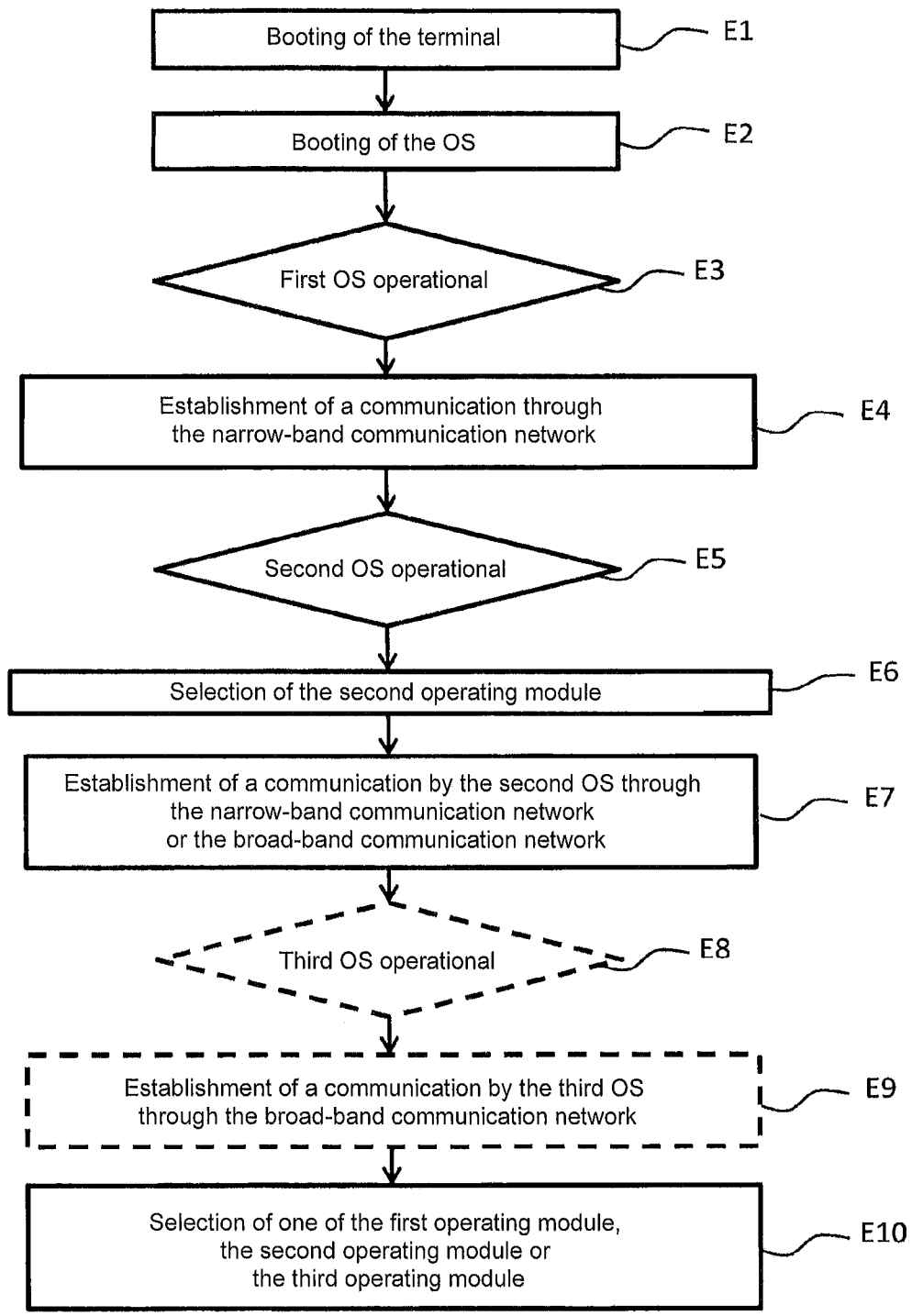
FIG. 3 illustrates an embodiment of the method according to the invention.

The implementation of the invention is described with reference to FIG. 3.

The dual mobile terminal 100 is initially turned off, that is to say that no operating system 115, 125, 135 of the terminal 100 is in operation.

When the terminal 100 is booted in a step E1, that is to say when it is put into operation, the management module 140 boots, in a step E2, the first operating system 115 of the first operating module 110 then the second operating system 125 of the second operating module 120 then finally the third operating system 135 of the third operating module 130.

During a first phase beginning once the booting of the first operating system 115 is finished at step E3, that is to say in less than 10 seconds after powering on the terminal 100, the terminal 100 may be used in a step E4 to establish a communication through the narrow-band communication network 10 to exchange, for example with the private mobile terminal 11, voice data and/or application data via the narrow-band communication module 104.

During this first phase, only the first operating system 115 is operational and makes it possible to communicate through the narrow-band communication network 10 via the narrow-band communication module 104. In other words, it is not yet possible to communicate with the broad-band communication network 20.

When the management module 140 detects that the booting phase of the second operating system 125 is finished (step E5), for example at the end of around 45 seconds, the management module 140 selects, for example automatically, in a step E6, the second operating module 120 in order that, in a step E7, any communication established by the first operating system 115 is continued by the second operating system 125 or instead that a new communication is established through the narrow-band communication network 10 or the broad-band communication network 20.

During this second phase starting once the booting phase of the second operating system 125 is finished, only the second operating system 125 is used to communicate.

When the management module 140 detects that the booting phase of the third operating system 135 is finished (step E8), for example at the end of around 55 seconds, the management module 140 may select, for example automatically, the third communication module 120 in order that any communication to establish in a step E9, for example with the broad-band mobile terminal 21, is done so through the broad-band communication network 20 to exchange voice data and/or application data via the broad-band communication module 106.

Such a selection may be made as a function of the applications such as when, for example, certain applications are managed by the third operating module 130 whereas they are not managed via the second operating module 120.

Once again, when the third operating system 135 is selected, only said third operating system 135 is used to communicate.

When the second operating system 125 is selected but is faced with a malfunction, or instead when the battery level 150 is below a predetermined threshold, for example 20% of its maximum charge, then the management module 140 selects, for example automatically, in a step E10 the first operating module 110 such that only the first operating system 115 is then useable to make it possible, for example, to save energy.

In the same way, when the third operating system 135 is selected but is faced with a malfunction, or instead when the terminal 100 receives a communication for a PMR service managed by the second operating module 120 then the management module 140 selects, for example automatically, still in a step E10, the second operating module 120 such that the second operating system 125 then becomes useable in order that the terminal 100 initiates or continues data exchanges at a high data transfer rate via the broad-band communication module 106.

In addition, when the third operating system 135 is selected but when the battery level 150 is below a predetermined threshold, for example 20% of its maximum charge, then the management module 140 selects automatically, still in a step E10, the private communication module 110 such that only the first operating system 115 is then useable, this making it possible in fact to save energy.

Furthermore, when a user of the terminal 100 wishes himself to select one of the first operating module 110, the second operating module 120 or the third operating module 130, he may for example press on one or more keys of the terminal 100 in order to select one of the operating modules 110, 120, 130 not used. For example, he may decide to switch from the first operating module 110 to the second operating module 120 or instead from the third operating module 130 to the second operating module 120, etc.

Additionally, when the management module 140 selects the second operating module 120 and when a communication has been established beforehand by the first operating module 110, the management module 140 can switch said communication such that it is continued by the first public communication module 120 through the narrow-band communication network 20 via the narrow-band communication module 104.

In the same way, when the management module 140 selects the first operating module 110 and when a communication has been established beforehand by the second operating module 120, the management module 140 can switch said communication such that it is continued by the first operating module 110 through the narrow-band communication network 10 still via the narrow-band communication module 104.

The invention claimed is:

1. A mobile communication terminal, comprising:
a narrow-band communication module,
a broad-band communication module,
a first operating module,
a second operating module, and
a management module of the first operating module and the second operating module,
said first operating module being configured to establish a communication through a narrow-band communication network via said narrow-band communication module,
said second operating module being configured to establish a communication through said narrow-band communication network via the narrow-band communication module and to establish a communication through a broad-band communication network via said broad-band communication module,
wherein the first operating module includes a first operating system configured to execute instructions making it possible to establish a communication through the narrow-band communication network via the narrow-band communication module, and
wherein the first operating system includes a limited number of booting tasks so as to be operational within a time period of less than ten seconds after the booting of the terminal,
wherein the second operating module includes a second operating system configured to establish a communication through said narrow-band communication network via the narrow-band communication module and to establish a communication through the broad-band communication network via the broad-band communication module,
wherein the management module is configured to select the first operating module following a malfunction of the second operating system or when, the terminal including a battery, a battery level is below a predetermined threshold, or on the action of a user of said terminal.

2. The terminal according to claim 1, wherein the management module is configured to boot the first operating system and the second operating system.

3. The terminal according to claim 1, wherein the management module is configured to select alternatively one of the first operating module and the second operating module.

4. The terminal according to claim 1, wherein the management module is configured to select the second operating module when the booting phase of the second operating system is finished.

5. The terminal according to claim 1, further comprising a third operating module including a third operating system configured to execute instructions making it possible to establish a communication through the broad-band communication network via the broad-band communication module.

6. A system, comprising: at least one terminal according to claim 1 and either at least one narrow-band communication network or at least one broad-band communication network or both the at least one narrow-band communication network and the at least one broad-band communication network.

7. A method of communication, implemented by a terminal according to claim 1, comprising: establishing by the first operating module a communication through a narrow-band communication network via the narrow-band communication module, followed by transferring said communication to the second operating module such that the transfer enables communication to be continued through said narrow-band communication network via the narrow-band communication module.

8. The method according to claim 7, further comprising selecting one of the first operating module and the second operating module, automatically or on the action of a user.

9. The method according to claim 8, selection further comprising selecting the second operating module when the booting phase of the second operating system is finished.

* * * * *